United States Patent [19]

Aune et al.

[11] Patent Number: 4,957,551
[45] Date of Patent: Sep. 18, 1990

[54] METHOD FOR TREATMENT OF DUST RECOVERED FROM OFF GASES IN METALLRUGICAL PROCESSES

[75] Inventors: Jan A. Aune, Langhus; Thor Pedersen, Oslo, both of Norway

[73] Assignee: Elkem a/s, Norway

[21] Appl. No.: 209,492

[22] Filed: Jun. 20, 1988

Related U.S. Application Data

[63] Continuation-in-part of Ser. No. 40,307, Apr. 20, 1987, abandoned.

[30] Foreign Application Priority Data

Apr. 2, 1987 [NO] Norway ................................. 871369

[51] Int. Cl.$^5$ ............................................. C22B 7/02
[52] U.S. Cl. ...................................... 75/657; 75/10.28; 75/10.3; 75/961; 75/707
[58] Field of Search ........................ 75/10.28, 25, 10.3, 75/88, 657, 961, 707; 423/240; 55/71; 266/157

[56] References Cited

U.S. PATENT DOCUMENTS

| | | | |
|---|---|---|---|
| 3,364,009 | 1/1968 | Kemmetmuller | 75/25 |
| 3,372,528 | 3/1968 | Hoff | 75/25 |
| 4,372,780 | 2/1983 | Madelin | 75/10.3 |

Primary Examiner—Melvyn J. Andrews
Attorney, Agent, or Firm—Lucas & Just

[57] ABSTRACT

The method for treating the dust entails the following steps:
(a) supplying a combination of dust, a reducing agent and flux to a gastight electrothermic smelting furnace,
(b) smelting, reducing and volatilizing certain metals in the smelting furnace,
(c) tapping of an inert slag phase and a liquid metal phase from the smelting furnace,
(d) continuous removal from the smelting furnace of a gas phase containing chiefly CO-gas, metal fumes, sulphur, chlorides and fluorides together with entrained unreacted dust,
(e) further treatment of the gas phase.

The process produces an inert slag phase which can be safely deposited in a landfill. The process also allows for recovery of valuable metal components from the dust.

12 Claims, 4 Drawing Sheets

METHOD FOR TREATMENT OF DUST RECOVERED FROM OFF GASES IN METALLRUGICAL PROCESSES

This application is a continuation-in-part of U.S. application Ser. No. 040,307, filed Apr. 20, 1987 now abandoned.

The present invention relates to a method for treating dust precipitated from the waste gases of a metallurgical process, especially dust precipitated from waste gases produced during the production of steel. The method and system of the present invention processes the dust to a form that can be deposited without the risk of environmental pollution, and allows for recovery of the valuable components in the dust.

In the production of steel in electric smelting furnaces and during the subsequent oxygen refining of the steel, large amounts of dust are formed which are entrained in the waste gases from the smelting furnaces or the converters. This dust is precipitated from the waste gases in filter systems such as bag filters or other known filtering systems. This dust, which is called Electric Arc Furnace or EAF dust, consists mainly of agglomerates of very small and chemically complex particles. The particle size of the primary particles is usually within the range of 0.1 to 10 μm. EAF dust is composed of complex oxides of elements evolved during the smelting and refining steps. Typically, EAF dust contains oxides of iron, zinc, lead, cadmium, chromium, manganese, nickel, copper, molybdenum and other components which are present in scrap iron.

Table 1 presents a chemical analysis of EAF dust from four different steel producers. The chemical analysis of EAF dust indicates that the composition of EAF dust is directly influenced by the scrap iron which is used and by those alloying additives which are added to the steel smelter. There does not appear to be any direct connection between the chemical composition of EAF dust and furnace size, filter system or other factors.

TABLE 1

| Composition of EAF Dust in % of Weight | | | | |
|---|---|---|---|---|
| | Dust A | Dust B | Dust C | Dust D |
| $Fe_2O_3$ | 45.0 | 56.14 | 3.0 | 53.5 |
| $ZnO$ | 28.3 | 13.2 | 18.4 | 13.1 |
| $CdO$ | 0.12 | 0.03 | 0.01 | 0.01 |
| $AgO$ | 0.01 | — | — | — |
| $MoO_3$ | 0.09 | 0.09 | 0.09 | 0.09 |
| $PbO$ | 3.39 | 1.36 | 2.23 | 1.51 |
| $As_2O_3$ | 0.01 | — | 0.01 | 0.006 |
| $Cr_2O_3$ | 0.16 | 0.22 | 0.18 | 0.19 |
| $V_2O_5$ | 0.02 | 0.04 | 0.03 | 0.04 |
| $TiO_2$ | 0.04 | 0.09 | 0.08 | 0.08 |
| $BaO$ | — | 0.03 | — | — |
| $CaO$ | 4.81 | 10.42 | 15.19 | 10.14 |
| $Sb_2O_3$ | 0.03 | 0.01 | — | 0.01 |
| $SiO_2$ | 3.0 | 3.3 | 2.0 | 2.1 |
| $SO_4$ | 1.52 | 1.18 | 2.12 | 2.14 |
| $Cl$ | 1.94 | 1.44 | 0.21 | 1.31 |
| $Na_2O$ | 2.21 | 1.25 | 3.41 | 2.76 |
| $MgO$ | 3.31 | 2.50 | 2.80 | 3.42 |
| $F$ | 0.19 | 1.39 | 0.55 | 0.46 |
| $CuO$ | 0.37 | 0.18 | 0.17 | 0.23 |
| $NiO$ | 0.04 | 0.03 | 0.02 | 0.03 |
| $CoO$ | 0.03 | 0.03 | 0.02 | 0.03 |
| $MnO$ | 4.72 | 6.33 | 4.33 | 5.08 |
| $SnO_2$ | 0.05 | 0.10 | 0.03 | 0.04 |
| $K_2O$ | 1.4 | 0.6 | 1.3 | 1.3 |
| $P_2O_5$ | 0.17 | 0.24 | 0.17 | 0.20 |
| $Al_2O_3$ | 0.45 | 0.86 | 0.38 | 0.31 |
| Total: | 101.38 | 101.02 | 97.25 | 98.08 |

Some of the elements which are usually present in EAF dust are leachable such as lead, cadmium, chromium and arsenic. If the EAF dust is deposited directly into a landfill, then these elements may in the course of time be leached from the dust. The leaching of these chemicals into the environment can result in serious pollution to the environment. For this reason, some countries have very strict requirements on depositing EAF dust in landfills. In the future, the depositing of EAF dust in the form in which it is precipitated from the waste gas will not be allowed.

A number of different methods for processing EAF dust to a form that can be deposited without danger of environment pollution have been suggested. Some of these processes make it possible to transform EAF dust to a non-hazardous waste product and simultaneously recover the metals contained in the dust. Plasma smelting is one such process. These known processes are not, however, economically feasible.

Applicant has now discovered a method and system for treating dust precipitated from the waste gases of a metallurgical process in a simple, reliable and economically advantageous way. The present invention processes the dust into a form that can be deposited in a landfill without any risk of pollution to the environment and allows for recovery of valuable components from the dust.

The present invention relates to a method and system for treating dust precipitated from the waste gases of a metallurgical process, especially dust precipitated from the waste gases produced during the production of steel. The present invention is characterized by a combination of the following steps:

(a) continuously or approximately continuously supplying a combination of dust and a reducing agent and possible fluxes to a gastight covered electrothermic smelting furnace, (b) smelting, selectively reducing and volatilizing volatile metals from the combination in the smelting furnace, (c) tapping continuously or intermittently an inert slag phase and possibly liquid metal phase from the smelting furnace, (d) removing continuously from the smelting furnace a gas phase containing mainly CO-gas, metal fumes, sulphur, chlorides, fluorides and entrained, unreacted dust, (e) possibly selectively condensing one or more metals from the metal fumes in the gas phase, (f) controlling after combustion oxidizable components in the gas phase, (g) removing entrained, unreacted dust from the gas phase, and (h) finally purifying and neutralizing the remaining gas phase.

According to a preferred embodiment of the method of the present invention, $SiO_2$-sand is added as a flux in step (a).

The quantity of flux added must be adjusted so that the actual smelting temperature produces a slag with satisfactory low viscosity so that the slag can be tapped from the smelting furnace, and when it is cooled produces a microstructure which is non-leachable.

As the composition of the dust treated by the process of the present invention varies, the amount of added flux will also vary. The amount of flux added must be determined for the different types of dust on the basis of phase diagram and leaching tests carried out with the slag produced.

According to another preferred embodiment, dust, reducing agent and possible fluxes are added to the smelting furnace in the form of agglomerates such as pellets or briquettes.

The temperature in the smelting furnace must be maintained within the range between about 1250° C. to about 1750° C. and preferably within the range between about 1300° C. to about 1400° C.

The entrained, unreacted dust is preferably removed from the gas phase by dry-filtering, for instance in filter bags and recycled to the smelting furnace. The neutralization of the gas phase is preferably carried out in wet scrubbers. p It has also been discovered that if the chloride content in the gas phase is high, the chlorides condense on the walls of the apparatuses used in the steps of selective condensation of the metals from the metal fumes in the gas phase and the step of removing the entrained, unreacted dust from the gas phase. Typically, a bag house is used in the step of removing entrained, unreacted dust from the gas and it has been found that the chlorides in the gas phase destroy the bags in the bag filters. A gas cooler is typically used in the selective condensation of the metal from the metal fumes in the gas phase and it has been found that the chlorides condense on the walls of the gas cooler and cause the gas cooler to lose its effectiveness.

This chloride problem has now been solved by subjecting the gas phase to a wet cleaning step. The wet cleaning step dissolves the chlorides in water and subsequently removes the chlorides from the water.

The method of the present invention will be described below in reference to the drawings in which.

Figure 1:
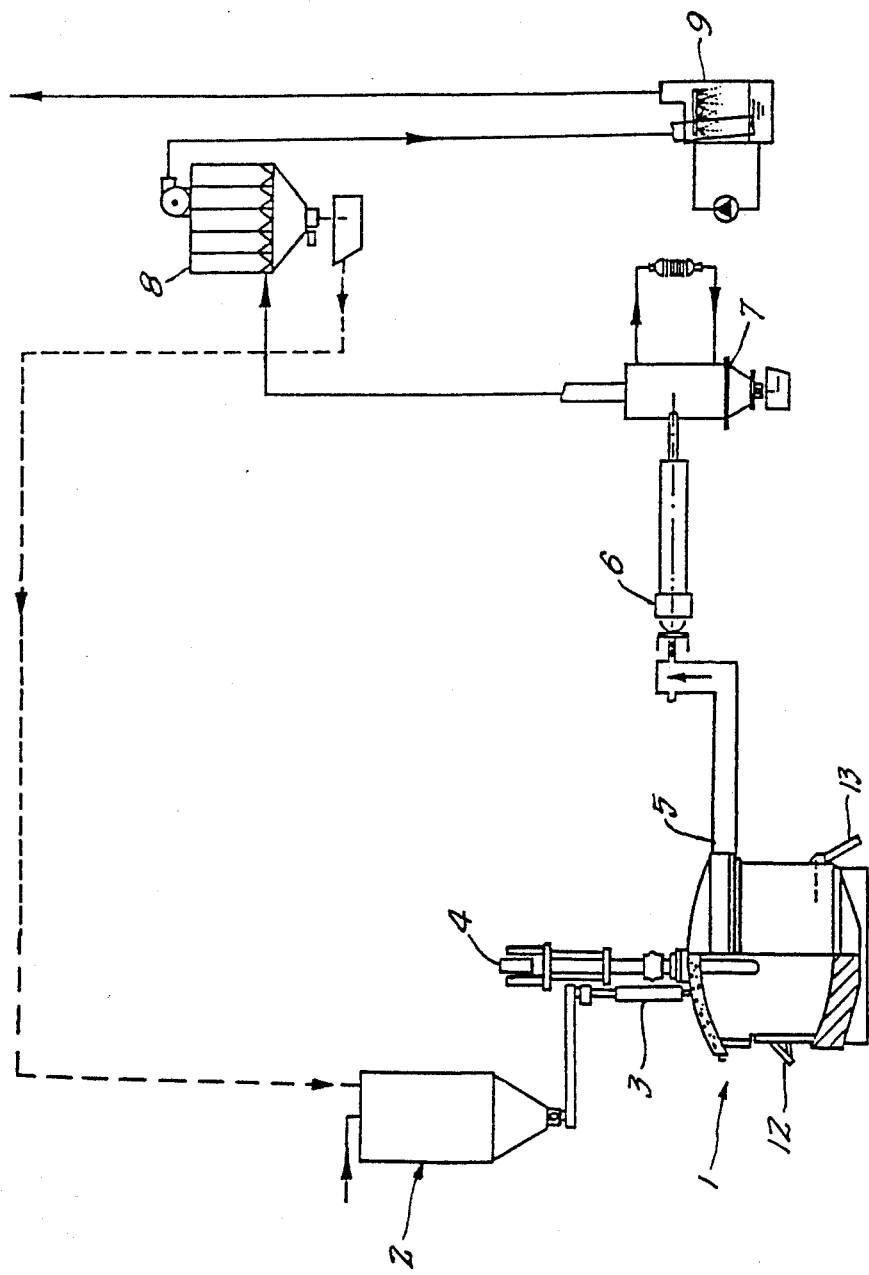
FIG. 1 shows a flow diagram for a means of carrying out the method of the present invention.

According to the embodiment shown in FIG. 1, a combination of EAF dust, reducing agent in the form of coke or coal and a flux of $SiO_2$-sand is supplied to a gastight covered electrothermic smelting furnace 1. The raw materials are supplied from bin 2 through charging chutes 3 to the surface of the molten bath in smelting furnace 1. These raw materials are supplied preferably in the form of agglomerates with a maximum size of about 25–50 mm.

Smelting furnace 1 can be of any conventional type, but it is preferred to utilize an electrothermic smelting furnace with circular section equipped with three carbon electrodes 4. (Only one electrode is shown in FIGS. 1–4). The furnace bottom is preferably lined with refractory magnesite bricks. As the refractory bottom lining in the smelting furnace will always be covered by the molten metal bath, it will receive little wear and no maintenance of the bottom lining is required. The sidewalls of the smelting furnace are preferably built up by convection cooled panels in which there is circulated a liquid, non-explosive cooling medium. During operation of such a smelting furnace, a permanent layer of solidified slag will form on the inside of the convection cooling panels which will protect the panels. The layer of solidified slag will eliminate maintenance of the convection cooling panels and in addition also allow recovery of heat energy which is lost through the sidewalls.

The electrodes are inserted through the furnace cover in an absolutely gastight way so that leakage of gas from the furnace as well as penetration of air into the furnace will not occur.

In smelting furnace 1 the supplied raw materials are smelted at a temperature of about 1300° C. By controlling the supply of the reducing agent and the $SiO_2$-sand, an inert slag phase and a metal phase containing iron, copper, nickel together with minor amounts of other metals which are present in the EAF dust will form in furnace 1. Easily reducible and volatile elements primarily zinc, lead and cadmium will be reduced and volatilized into a gas phase. Possible chlorides, sulphur components and fluorides in the dust will be partly expelled into the gas phase. The gas phase will also contain an amount of entrained and unreacted dust.

From smelting furnace 1 there can be tapped out an inert slag phase which after, for instance, granulating and cooling can be deposited without any danger that some of the elements or components in the slag shall be leached. Further, from time to time, a metallic phase containing iron, copper, nickel and minor amounts of other metals is tapped from furnace 1. This metal phase can either be deposited or sold for recovery of the metal values. The slag phase and the metal phase are tapped preferably through two different tapping holes 12 and 13. Some lead oxide will be reduced in the smelting furnace and gradually accumulate as a metallic lead phase in the bottom of the furnace. This lead phase can from time to time be drained off from the furnace bottom through a separate tapping spout. (Not shown in the drawing).

The gas phase which is formed in smelting furnace 1 contains CO-gas which is evolved during selective reduction in the smelting furnace 1, metal fumes, sulphur, chlorine and fluorine components together with possible entrained and unreacted dust.

The gases which are evolved in smelting furnace 1 and make up the gas phase are piped out from the furnace through gas pipe 5 and piped to afterburner 6 in which the metal fumes, as for instance zinc fumes, are oxidized to zinc oxide and in which the CO contents of the gas is combusted to $CO_2$ and sulphur oxidized to $SO_2$. The gases in the gas phase are subsequently cooled in gas cooler 7 whereupon the gas phase is piped off to bag filter house 8 in which solid particles are precipitated from the gas phase. The solid particles which are precipitated will contain up to 90% ZnO and can be further processed to pure zinc oxide according to known technology.

If the gas phase contains important amounts of sulphur, chloride and/or fluorine components, these can be removed from the gas in a known manner by means of wet scrubbing 9, before the rest gas is let out into the atmosphere and the washing liquid is neutralized.

Figure 2:
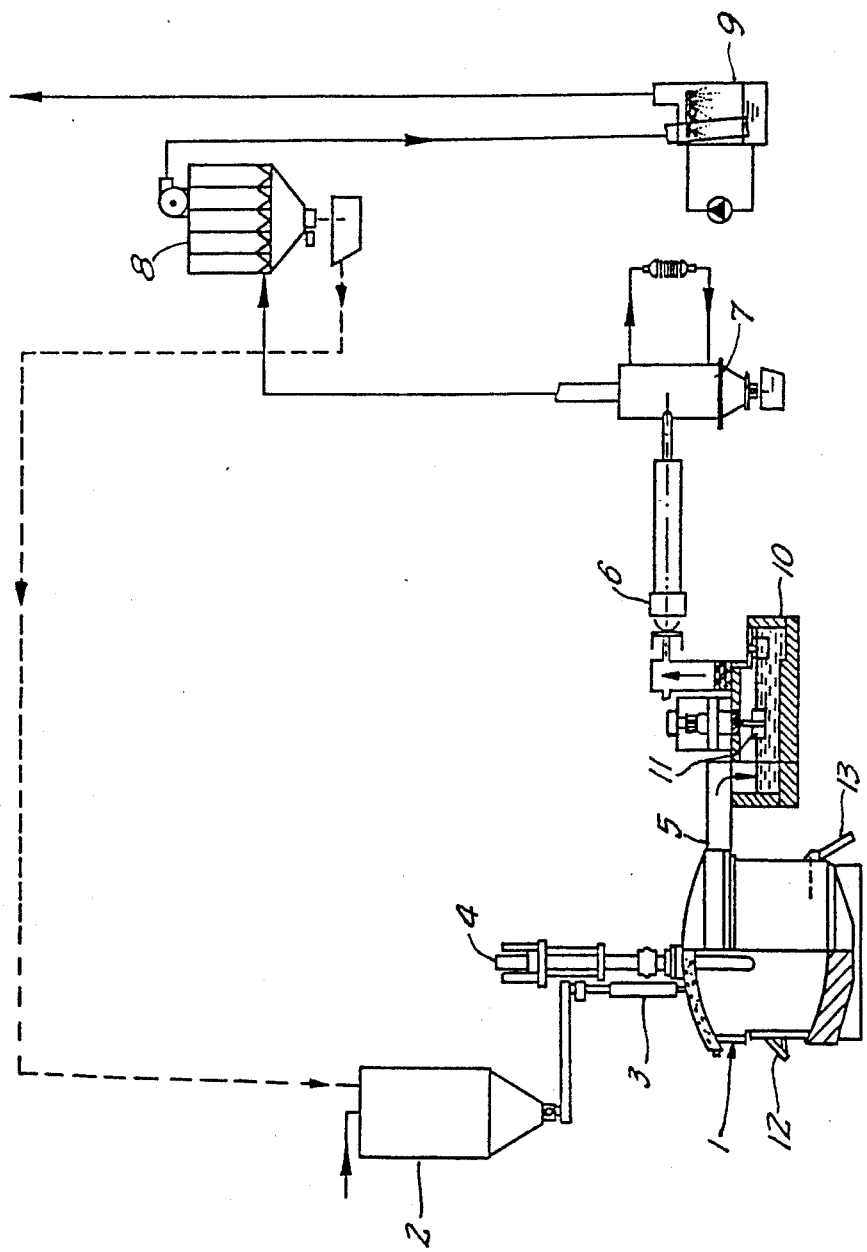
FIG. 2 shows a flow diagram for another method according to the present invention.

The embodiment of the invention which is illustrated in the flow diagram in FIG. 2 differs from that in FIG. 1 only by the fact that in front of the afterburner 6 a step for selective condensation of metal fumes contained in the gas phase is inserted. The steps in FIG. 2 which correspond to steps in FIG. 1 are indicated by corresponding numbers.

As indicated in FIG. 2, the gas phase from smelting furnace 1 is piped to a condensation step in which the metal fume in the gas phase is selectively condensed in one or more condensers 10. FIG. 2 only shows one condenser 10. As zinc fume usually constitutes the dominating amount of metal fume in the gas phase, condensation step 10 will be described in connection with condensation of zinc.

Zinc condenser 10 is of conventional type with zinc as condensing medium. A condenser with lead as the condensing medium is an alternate choice. The gas phase is led through a bath of molten zinc which is agitated by means of mechanical agitator 11. The bath is maintained at a temperature between 500° and 700° C. By contact with the melt, the zinc fume in the gas phase will be condensed and accumulated in the zinc bath. The zinc is removed continuously by overflow from zinc condenser 10.

Minor amounts of zinc chloride, cadmium chloride and lead chloride which may be present in the gas phase will also be condensed in the zinc condenser. Unreacted dust will also be deposited in zinc condenser 10. As the density of these components are importantly lower than that of metallic zinc or lead, the condensates of zinc chloride, cadmium chloride, lead chloride and unreacted dust will be collected as a dross on the top of the molten bath in zinc condenser 10. This dross can at intervals be removed from the bath and either sold or returned to the smelting furnace.

The remaining gas phase which leaves the condenser will have a temperature of about 700° C. This gas phase is piped to afterburner 6 and further treated as described above in connection with FIG. 1. By the method of FIG. 2, the amount of unreacted dust which is removed from the bag filter will, of course, be considerably lower than the amount according to the method of FIG. 1.

The unreacted dust which is removed from the bag filter can be returned to the smelting furnace either continuously or accumulated for batchwise addition to the furnace.

It has also been found that if waste materials containing volatile metals are combined with the EAF dust before charging the smelting furnace, recoverable amounts of these volatile metals are obtained. This is an inexpensive way to produce metal from waste materials and dust. For example, waste or off-grade zinc oxide is mixed with EAF dust prior to addition to the furnace 1. The mixture is smelted and metallic zinc is recovered in zinc condenser 10.

The embodiments for wet cleaning of the gas phase high in chlorides will now be described in connection with FIGS. 3 and 4.

Figure 3:
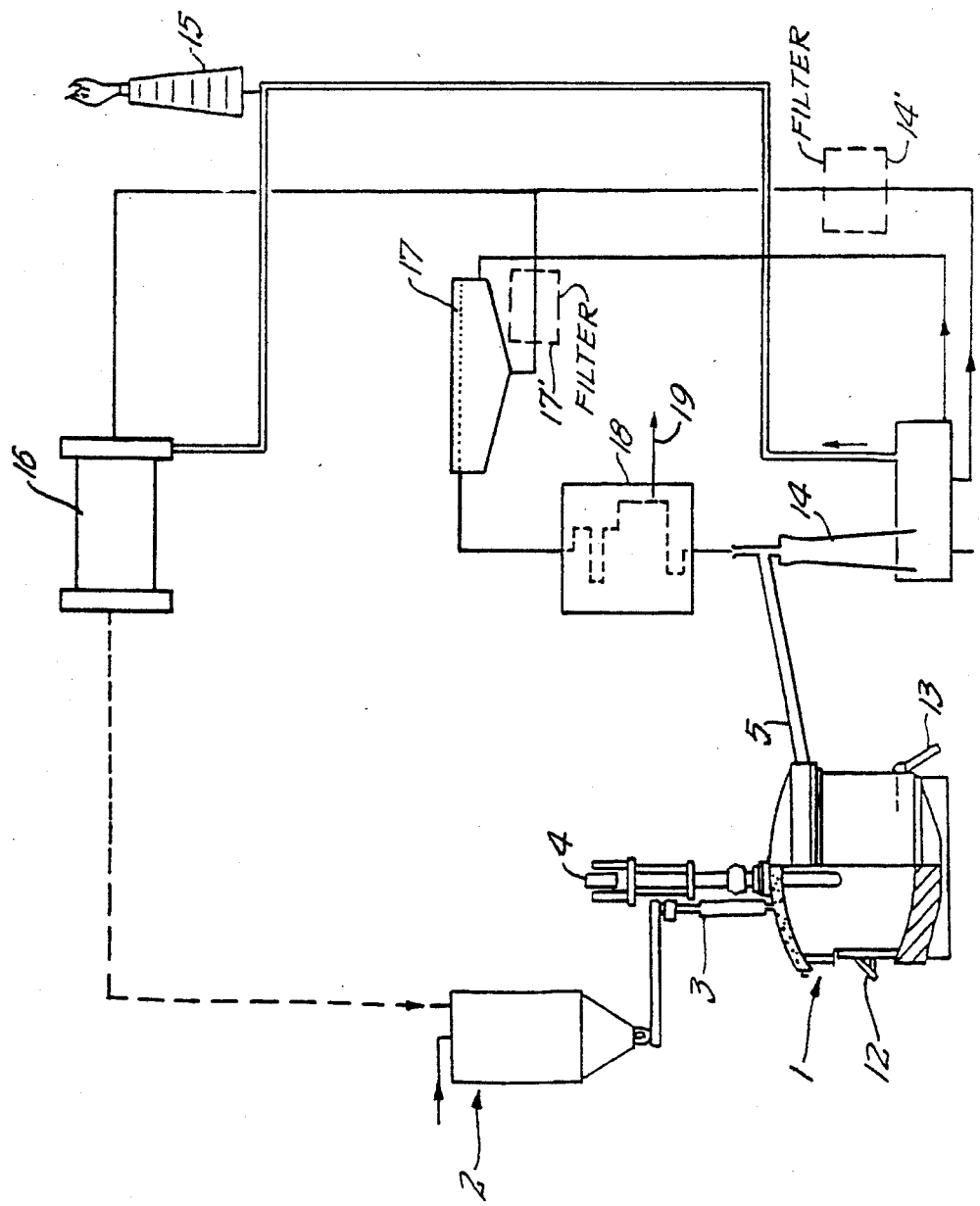
FIG. 3 shows a flow diagram of the present invention for treating the gas phase having a high chloride content.

In the embodiment shown in FIG. 3, the gas phase is piped from the furnace through pipe 5 and directly to wet gas cleaning apparatus 14, preferably a venturi scrubber. In wet gas cleaning apparatus 14 the entrained, unreacted dust in the gas phase will be transferred to a water phase and water soluble chlorides in the unreacted dust will be dissolved in the water. The cleaned gas phase leaving wet cleaning apparatus 14 is forwarded to afterburner 15 to combust residual carbon monoxide contained in the gas phase. Afterburner 15 is provided with a natural gas booster flame to ensure complete and continuous oxidation, of all combustible components in the gas phase. Exhaust gases should be piped through a bag filter to remove any particles and continuously monitored for oxygen and carbon monoxide content.

A part of the unreacted dust collected in wet gas cleaning apparatus 14 is discharged as a sludge and is, preferably after filtering 14', forwarded into drying apparatus 16, for example a rotary kiln, where the sludge is dried. The dried sludge is preferably returned to smelting furnace 1, but can also be disposed of. A part of the cleaned gas phase from the wet gas cleaning apparatus 14 can be used as an energy source in drying apparatus 16.

The liquid from wet gas cleaning apparatus 14 which still contains part of the unreacted dust is pumped to clarifier 17 for partially dewatering the solids. The clarifier underflow containing the solids is, preferably after filtering 17', combined with the sludge from wet gas cleaning apparatus 14.

The overflow from clarifier 17 comprises water which contains dissolved chlorides. This overflow is piped to combined water cooling and water cleaning apparatus 18. In water cooling and water cleaning apparatus 18, the water is cooled and a bleed stream is treated to remove chlorides by known techniques. The bleed stream is discharged as indicated by 19. The rest of water cooled in water cooling and water cleaning apparatus 18 is returned to wet gas cleaning apparatus 14.

In the embodiment of the invention shown in FIG. 3, the chloride content in the unreacted dust in the gas phase is effectively removed and the unreacted dust can be recirculated to the smelting furnace. There will thus be no chloride built up in the system even if all the unreacted dust is recirculated to the smelting furnace.

Figure 4:
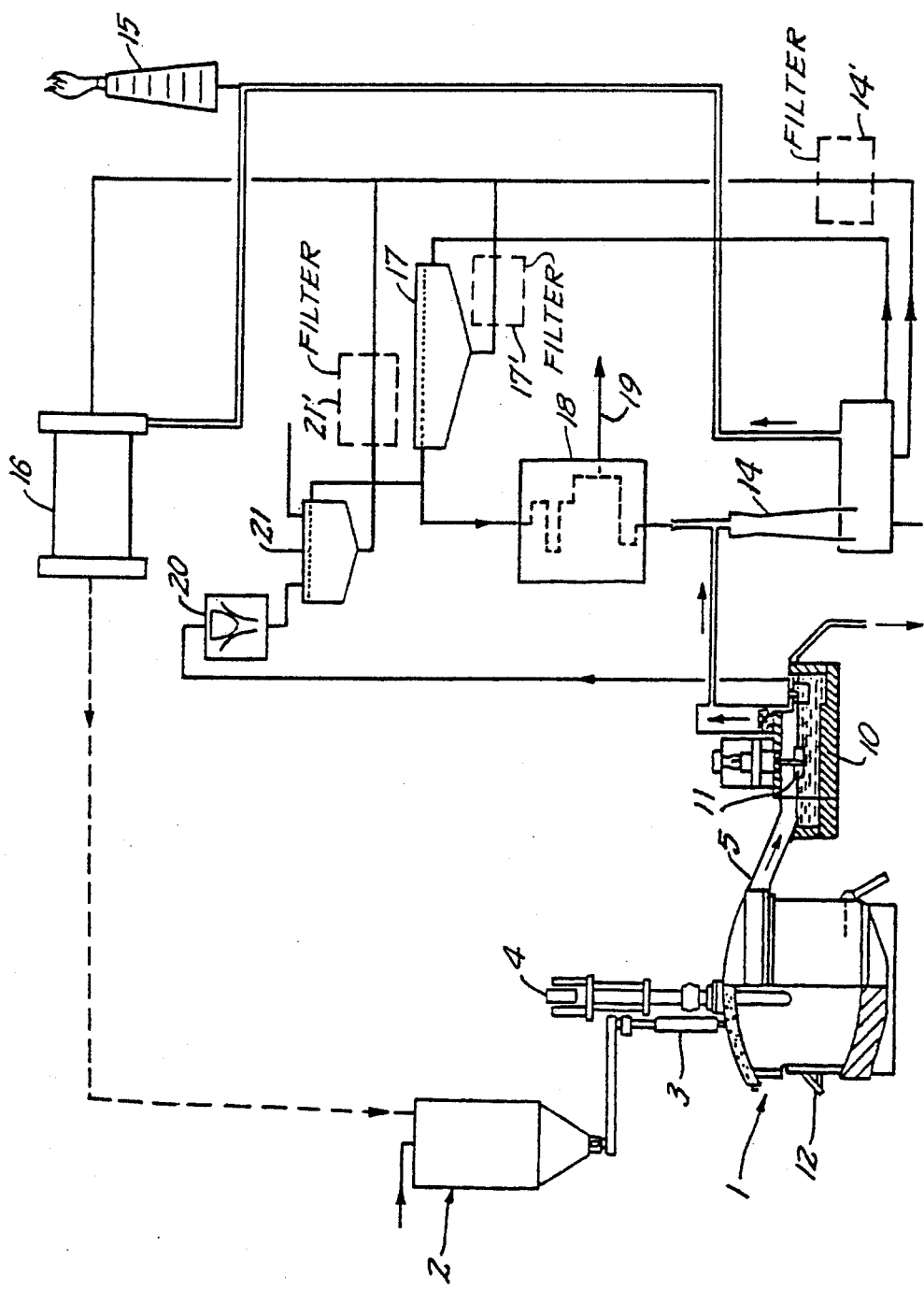
FIG. 4 shows a flow diagram of another method according to the present invention for treating the gas phase having a high chloride content.

In the embodiment shown in FIG. 4, zinc condenser 10 is included between pipe 5 and wet gas cleaning apparatus 14. The wet gas cleaning of the embodiment of FIG. 4 is identical to the embodiment of FIG. 3. However, as described in connection with the embodiment of FIG. 2, minor amounts of zinc chloride, cadmium chloride, lead chloride and other chlorides which are contained in the gas phase will be condensed in the zinc condenser and together with unreacted dust, form a dross floating on the top of the zinc bath.

According to the embodiment shown in FIG. 4, this dross is removed from the condenser and crushed in crusher 20 and thereafter washed with water in washing apparatus 21. In washing apparatus 21 the chloride content of the dross is dissolved in the water. The underflow from apparatus 21 containing the washed solid is, preferably after filtering 21', combined with the sludge from wet gas cleaning apparatus 14 and from thickener 17. The solids from apparatus 21 will contain very little chlorides and can be returned to the smelting furnace together with the other solids removed from the gas phase.

The overflow from apparatus 21 is combined with the overflow from thickener 17 and returned to wet gas cleaning apparatus 14 after cooling and cleaning.

The process as disclosed in FIGS. 3 and 4 is used when the gas phase has a high chloride content. Generally, when the chloride content is about 0.2 and above, the method of FIGS. 3 and 4 have been found to be of advantage.

EXAMPLE

EAF dust having the composition of dust C in Table 1 was treated according to the method described in connection with FIG. 1.

The dust was, beforehand, pelletized together with $SiO_2$-sand as a flux together with coke as a reduction agent in a quantity necessary for reducing $Fe_2O_3$ to FeO, ZnO to Zn and PbO to Pb. The pellets were supplied continuously to the smelting furnace and smelted at a temperature of about 1300° C. An inert slag phase and a metal phase were tapped from the smelting furnace. Unreacted dust was recovered from the bag filter and from the gas scrubber.

Table 2 shows the distribution of the elements in the EAF dust as distributed in respectively slag phase, metal phase and unreacted dust recovered from bag filter plus scrubber.

Table 2 shows that 99% of the zinc in the EAF dust had been recovered in the bag house. Table 2 further shows that the main quantity of Fe, Cr, Mo, Mn, Ca, Mg, Al, F and Si was present in the inert slag phase. The metallic phase contained some Fe and the main quantity of copper and nickel together with minor amounts of other metals.

TABLE 2

| Element | Weight % of total in slag | Weight % of total in metal phase | Weight % of total in dust |
|---|---|---|---|
| Fe | 89 | 10 | 1 |
| Zn | 1 | — | 99 |
| Pb* | 1 | — | 70 |
| Cd | 5 | — | 95 |
| Cr | 96 | 4 | — |
| Mo | 65 | 20 | 15 |
| Cu | 8 | 92 | — |
| Ni | 30 | 70 | — |
| As | 50 | 5 | 45 |
| Bi | 50 | 30 | 20 |
| Mn | 88 | 10 | 2 |
| Ca | 99 | 1 | — |
| Mg | 99 | 1 | — |
| Al | 99 | 1 | — |
| Na | 50 | — | 50 |
| Si | 99 | 1 | — |
| S | 20 | — | 80 |
| Cl | 5 | — | 95 |
| F | 70 | — | 30 |
| K | 20 | — | 80 |

*The remaining amount of lead, 2.9%, was accumulated in a separate lead phase at the bottom of the furnace.

The produced inert slag was leached in accordance with the following procedure:

100 grams of the produced slag was crushed to - 9.5 mm whereupon there was added 16 grams deionized water per gram. pH was adjusted to 5.0+0.2 by addition of 0.5 M acetic acid. The pH value must be further adjusted by addition of more acetic acid if the pH value exceeds 5.2. After 24 hours leaching deionized water was added according to the equation $V = 2 \times W - 16 \times W - A$, where $V$ = ml deionized water, $W$ = weighed amount of solid material, $A$ = ml 0.5 M acetic acid. When the water had been added, the sample was filtrated and the filtrate analyzed.

The result is shown in Table 3. In this table is further indicated the limit values as specified by the environmental protection authorities in the United States (EPA).

TABLE 3

| Result of leaching tests | | |
|---|---|---|
| | Present application mg/l | EPA limit values mg/l |
| As | <0.1 | 5.0 |
| Ba | 1.3 | 100.0 |
| Cd | <0.05 | 1.0 |
| Cr | <0.05 | 5.0 |
| Pb | <0.1 | 5.0 |

The results in Table 3 show that the slag which has been produced in accordance with the present invention fully satisfies the conditions specified by the Environmental Protection Agency in the United States.

Even though the present application chiefly describes the invention in connection with EAF dust, it is within the frame of this invention to treat any dust precipitated from the gases generated by metallurgical processes. An example of other types of dust which can be treated according to the method of the invention are BOF-dust, AOD-dust, Siemens-Martin dust, dust from production of ferroalloys, dust from copper smelting processes and other processes.

It will be understood that the preferred embodiments of the present invention herein chosen for the purpose of illustration are intended to cover all changes and modifications of the preferred embodiments of the present invention which do not constitute a departure from the spirit and scope of the invention.

What is claimed is:

1. A method for treatment of that dust precipitated from the waste gas of a metallurgical smelting process, said dust having a high metal chloride content, said method comprising the following steps:
    (a) admixing said dust with a reducing agent and a flux;
    (b) introducing said admixture to an operating gas-tight metallurgical smelting furnace, said smelting furnace producing an inert slag phase, a molten metal phase and a first gas phase, said first gas phase comprising dust from said smelting furnace, including metal chlorides, and off-gasses from said smelting furnace;
    (c) tapping said furnace to remove said inert slag phase and said molten metal phase;
    (d) removing said first gas phase from said smelting furnace;
    (e) wet scrubbing said first gas phase to remove the metal chlorides and dust from said first gas phase and thereby producing a second gas phase and a metal chloride-containing and dust-containing first liquid phase;
    (f) separating said first liquid phase into a dust-containing first sludge phase and a second liquid phase, said second liquid phase containing dissolved metal chlorides and residual dust;
    (g) clarifying said second liquid phase to remove said residual dust from said second liquid phase and thereby producing a dust-containing second sludge phase and a third liquid phase containing metal chlorides;
    (h) cooling said third liquid phase;
    (i) bleeding a stream from said third liquid phase and removing the metal chlorides from said bleed stream and discharging the bleed stream; and
    (j) drying said first and second dust-containing sludge phases.

2. The method of claim 1 further comprising the step of recycling dried sludge produced by step (j) to said smelting furnace.

3. The method of claim 1 wherein said second gas phase contains carbon monoxide and further comprising the step of burning said second gas phase to combust said carbon monoxide.

4. The method of claim 1 wherein said first gas phase which is removed from said smelting furnace contains metal fume and said first gas phase is passed through a molten metal bath for condensing said first gas phase and producing molten metal from said metal fume and a dross layer on top of said molten metal bath, said dross layer including condensates of metal chlorides.

5. The method of claim 4 further comprising the step of recycling dried sludge produced by step (j) to said electrothermic smelting furnace.

6. The method of claim 4 further comprising the step of burning said second gas phase.

7. The method of claim 4 further comprising the step of removing said dross layer from the top of the metal bath, crushing said dross layer and leaching said metal chlorides from said dross.

8. The method of claim 1 wherein the temperature in the smelting furnace is maintained between about 1250° and about 1750° C.

9. The method of claim 1 wherein $SiO_2$-sand is used as the flux.

10. The method of claim 1 wherein the dust, reducing agent and flux are added to the smelting furnace in the form of agglomerates.

11. The method of claim 1 wherein said first gas phase contains zinc and said first gas phase is subjected to a condensing step wherein a majority of said zinc is condensed.

12. The method of claim 8 wherein the temperature in the smelting furnace is maintained between about 1300° and about 1400° C.

* * * * *